US008245136B2

(12) United States Patent  (10) Patent No.: US 8,245,136 B2
Fischer  (45) Date of Patent: Aug. 14, 2012

(54) UPDATING INSERTED TEXT IN A GRAPHIC FILE

(76) Inventor: Olivier Fischer, Madeira, OH (US)

( * ) Notice: Subject to any disclaimer, the term of this patent is extended or adjusted under 35 U.S.C. 154(b) by 1513 days.

(21) Appl. No.: 11/677,639

(22) Filed: Feb. 22, 2007

(65) Prior Publication Data

US 2007/0195081 A1 Aug. 23, 2007

Related U.S. Application Data

(60) Provisional application No. 60/776,159, filed on Feb. 23, 2006, provisional application No. 60/846,796, filed on Sep. 22, 2006.

(51) Int. Cl.
*G06F 17/00* (2006.01)
(52) U.S. Cl. .................. 715/271; 715/256; 715/277
(58) Field of Classification Search .................. 715/256, 715/271, 253, 277
See application file for complete search history.

(56) References Cited

U.S. PATENT DOCUMENTS

| | | | |
|---|---|---|---|
| 5,175,684 A | 12/1992 | Chong | |
| 5,349,648 A | 9/1994 | Handley | |
| 5,860,073 A * | 1/1999 | Ferrel et al. | 715/255 |
| 7,013,289 B2 | 3/2006 | Horn et al. | |
| 7,162,688 B1 | 1/2007 | Gillig | |
| 2001/0044809 A1* | 11/2001 | Parasnis et al. | 707/513 |
| 2002/0036654 A1 | 3/2002 | Evans et al. | |
| 2002/0054115 A1* | 5/2002 | Mack et al. | 345/765 |
| 2003/0048294 A1 | 3/2003 | Arnold | |
| 2003/0229543 A1 | 12/2003 | Zimmerman et al. | |
| 2004/0015479 A1* | 1/2004 | Meek et al. | 707/1 |
| 2004/0041818 A1* | 3/2004 | White et al. | 345/619 |
| 2004/0260535 A1 | 12/2004 | Chen et al. | |
| 2005/0080804 A1* | 4/2005 | Bradshaw et al. | 707/102 |
| 2005/0251443 A1 | 11/2005 | Chan et al. | |
| 2006/0005126 A1 | 1/2006 | Shapiro | |
| 2006/0168534 A1* | 7/2006 | Goodman | 715/760 |
| 2006/0200766 A1 | 9/2006 | Lakritz | |
| 2007/0156744 A1* | 7/2007 | Harrington | 707/102 |

FOREIGN PATENT DOCUMENTS

WO  WO 0152117 A2 * 7/2001

OTHER PUBLICATIONS

Jan Kabili; Colin Smith, How to Wow: Photoshop for the Web, Peachpit Press, retreived from Safari Books Online Dec. 21, 2004.*
Birlanga, Dolores , "If You Want to Be Global, You Need to Be Local," Market Place and Business, Samedan, Ltd., Summer 2002.

* cited by examiner

*Primary Examiner* — Adam M Queler
(74) *Attorney, Agent, or Firm* — Calfee, Halter & Griswold LLP (57) ABSTRACT

An authoring tool provides a storage receptacle for text components of graphics designs. In one embodiment, the storage receptacle is a computer readable media (e.g., a hard drive or memory). The storage receptacle is easily accessed from within the graphics authoring environment and allows for the text to be changed independently of the graphics authoring environment, for possible future insertion into graphics files. Once a text item from the storage receptacle has been inserted in a graphics file, a relationship is maintained between the graphics file and the text item in the receptacle. This relationship can then be used in many ways, in particular to keep the text in the graphics file and the text in the receptacle synchronized. The storage receptacle can be implemented as a database system. In this manner the authoring tool automates the synchronization between the textual content which is usually drafted and edited outside of the graphics environment and the final graphics files in which the text will ultimately be inserted.

10 Claims, 4 Drawing Sheets

NEW AND MUCH IMPROVED
WITH BOLDER COLORS
AND BRIGHTER WHITES
300

| POSITION | TEXT | FORMAT |
|---|---|---|
| 1,1 | NEW | BOLD, ITAL |
| 1,2 | AND | STD |
| 1,3 | IMPROVED | BOLD, ITAL |
| 2,1 | WITH | STD |
| 2,2 to 2,3 | SUPER COLORS | BOLD, ITAL |
| 3,1 | AND | STD |
| 3,2 to 3,3 | BRIGHTER WHITES | BOLD, ITAL |

310

NEW AND MUCH *IMPROVED*
WITH *BOLDER COLORS*
AND *BRIGHTER WHITES*
320

FIG. 4

UPDATING INSERTED TEXT IN A GRAPHIC FILE

CROSS-REFERENCE TO RELATED APPLICATIONS

This application claims the benefit of U.S. Provisional Patent Application 60/776,159 filed on Feb. 23, 2006 and U.S. Provisional Patent Application and 60/846,796 filed on Sep. 22, 2006, the specification and drawings of which are incorporated herein by reference in their entirety for all purposes.

BACKGROUND

Graphic designs for product packaging and advertising most often include text along with the graphics. The text can include ingredient lists, contact telephone numbers, and warning labels that are developed by marketing or legal departments and often will eventually be translated into multiple languages. The graphic designs are generally developed by a separate graphic design group or by outside contractors who are not involved with the text development. This separation between the text development and graphic design processes makes it difficult to work on both components concurrently and may lead to significant graphic redesign when text is updated at the last minute, and does not fit the graphic design. This separation is also often the cause of errors when the graphic designer has to manually cut and paste text from a word processor document into a graphic file.

SUMMARY

The authoring tool provides for a repository of text, including text that is often used across many different graphics files. This text repository is conveniently accessible by graphic designers using a text tool that operates in their graphic design environment. The authoring tool establishes and maintains links between the text in the text repository and the graphics files into which text has been inserted so that the text can be updated and maintained separate from the graphic design environment and imported into the graphics file when so desired.

An authoring tool provides a storage receptacle for text components of graphics designs. In one embodiment, the storage receptacle is a computer readable media (e.g., a hard drive or memory). The storage receptacle is easily accessed from within the graphics authoring environment and allows for the text to be changed independently of the graphics authoring environment, for possible future insertion into graphics files. Once a text item from the storage receptacle has been inserted in a graphics file, a relationship is maintained between the graphics file and the text item in the receptacle. This relationship can then be used in many ways, in particular to keep the text in the graphics file and the text in the receptacle synchronized. The storage receptacle can be implemented as a database system. In this manner the authoring tool automates the synchronization between the textual content which is usually drafted and edited outside of the graphics environment and the final graphics files in which the text will ultimately be inserted.

DESCRIPTION

An authoring tool includes a text repository that stores textual elements for insertion in a graphics file and maintains a relationship between the textual elements and their location in the graphics file. Accordingly, the automates the synchronization between all the changes made regarding text, which are usually made and kept track of in word processors and email documents, and the final graphics files in which the text will ultimately be inserted. The authoring tool lets the graphic designer to select for use from existing approved text, thus speeding the creation process by alleviating the need to clear the text after it has been inserted in the graphics. The authoring tool lets the graphic designer select the same existing text for the same purpose across many graphics files thus allowing for greater consistency across different graphics files. Personnel working on the graphic design and personnel creating the text can work in parallel, and in synchronization, thus speeding the overall job of creating the final graphics file.

The present state of the art in managing the development of artwork, such as product labels and packages, that includes both text and graphics is the Digital Asset Management System (DAMS). A leader in the DAMS arena is Documentum. Typically, a DAMS stores the various label components as separate files. Artwork is stored as graphics files and text to be included with artwork to create the label is stored as word processor document files. When using a DAMS, a graphic designer has to manually compare the graphics file and the corresponding word processor document file to see if any changes need to be made to the artwork. If any changes need to be made, they have to be made manually by cutting and pasting from the word processor into the artwork file. This manual process of verification and update is error prone. In contrast to a typical DAMS that manages textual content at the file level, the authoring tool manages textual content at a more granular level.

Another class of artwork development tools leverages the concept of a template and allows the graphic designer to add text to an existing graphic design. Such a tool is BrandWizard which allows for substitution of text in a fixed graphic design but does not provide a full fledged graphical environment. Another such tool is the one described in U.S. Pat. No. 5,349,648 (Handley) which describes a template-based publishing system. Template based systems focus on eliminating the need for graphic design, and graphic designers, by automating the insertion of text in a fixed design. Rather than eliminating the ability to change graphic components of a label or package, the authoring tool described herein alleviates the burden normally associated with inserting and editing text in a graphic design, so the graphic designer can focus all of his/her energy on graphic design.

Overview

The authoring tool provides convenient access to text/copy for graphics designers using a software based graphic authoring environment such as Adobe Illustrator. The authoring tool includes a text tool that is capable of accessing a text repository of text/copy and allows a graphic designer to insert the text and related information into the graphics file being authored. The text tool provides indexes with which the author can access text in the text repository. The text tool also provides a way to insert a group of distinct text strings into a graphics file that have been specified as being part of a group associated with a given project, for example all the text that should be present on a specific package. The text tool also allows the graphic designer to associate the graphics file that a group of text is being inserted into with the group. The text tool enables the author to automatically check for updates on text, or group of text, already inserted into the graphic design by accessing the text repository. If the text, or group of text, has been updated, the text may be replaced automatically or manually altered by the author.

The text tool may include a text format conservation system that maps formatting from the prior version of the text already in the graphics file to newly inserted text, so that as much of the formatting work such as fonts, sizes, kerning, and colors of the characters and text layout that has been done is conserved. In most cases, the insertion of new text into a previously formatted version will not require any manual formatting. With previously existing DAMSs, when text was newly inserted, most of the formatting was lost and had to be manually redone when text needed to be updated.

The text repository may store a text string and its translation into an unlimited number of languages. The indexes and update functions can be used with translations as well. If a translation is not available, the text repository has a translation placeholder function that provides a placeholder for insertion into the graphic until the translation becomes available. The placeholder is generated based on the length of the original text and an algorithm that includes data about translation expansion ratios. The use of placeholders is useful, especially in the case of graphical authoring environments where the size of the placeholder helps the author make authoring/design decisions.

The authoring tool allows insertion of text in pre-existing graphical components in a graphics file, thereby allowing a workflow in which a graphic is roughly designed first and then text is later added to the graphic. In addition, the authoring tool has the capability to automatically group all of the inserted text of a given category defined by the graphic designer (language, package location, etc.) together in a single group layer in the graphic to facilitate operations on the group of text items as a whole.

Figure 1:
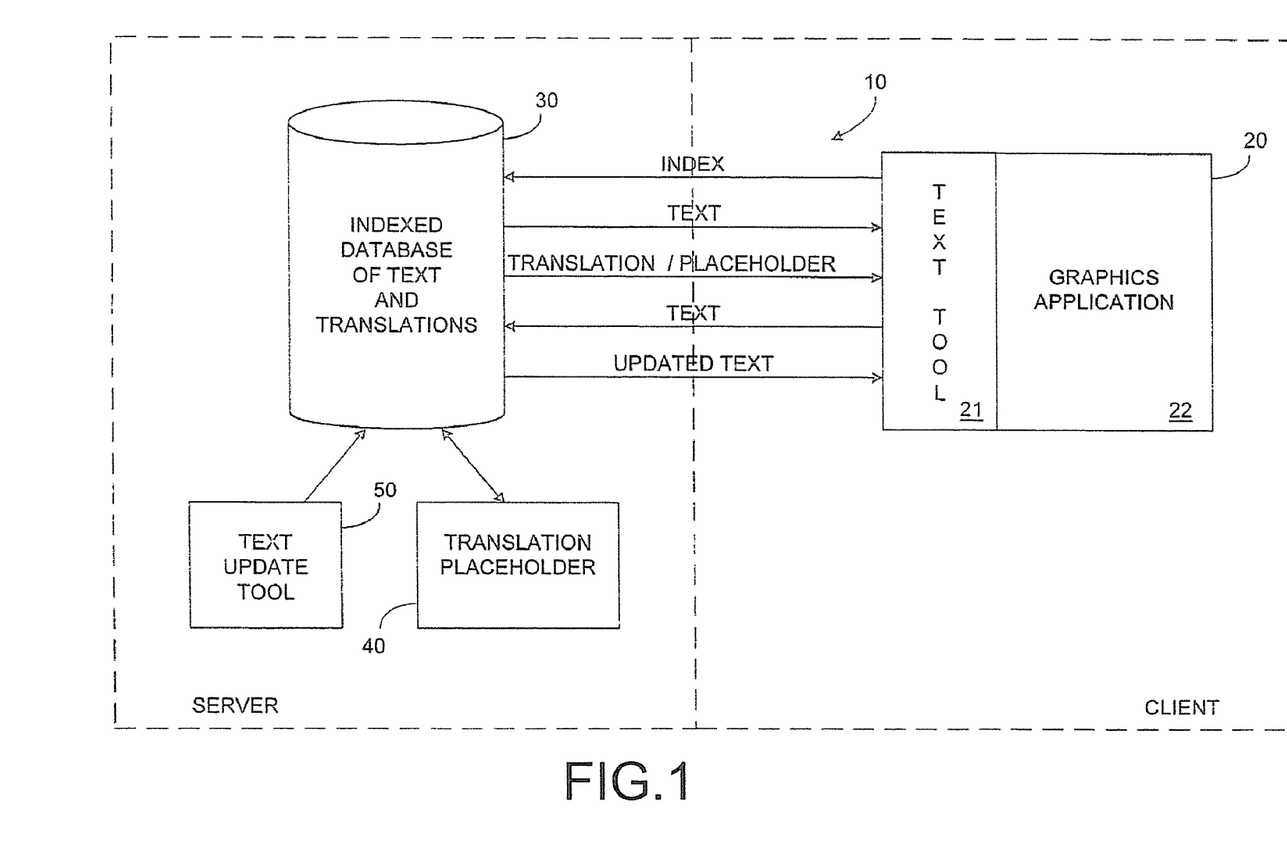
FIG. 1 is a functional block diagram of an authoring tool constructed in accordance with an embodiment of the present invention.

FIG. 1 is a functional block diagram of an authoring tool 10. The tool is distributed across a server that hosts a text repository database 30 and a client application that provides text tool functionality to the graphics designer within the graphics design environment. For the purposes of this description, the server component is built using web technology with php language, an Apache server, and a MySQL database. The client application is developed in a classic programming language such as C++ or Visual Basic. The described tool works with Adobe Illustrator and is built in C++ using the Adobe Illustrator plug-in framework. It will be apparent to one of skill in the art that many other computing components, languages, and applications to provide an authoring tool that gives access to remotely stored text in the graphic authoring environment.

On the server side of the authoring tool, the text repository 30 is constructed as a database of text including translations, and is stored for remote access by a text tool 21. The full range of database functions can be employed to manage the text including indexing, grouping, and text update monitoring. The management of text is thus performed in a centralized to reduce redundancy and errors. Within the text repository database, the text can be indexed on characteristics that help an author identify the type of text. For example, the text can be indexed by categories such as warning, ingredient, and contact information. Tables can be created within the database that will associate a group of text items with a specific project. For example, a table can be used to group all the text items that will need to be inserted into a specific graphic. The table is then used at insertion time to select text items that are indexed as being part of the specific graphic. The text tool can then insert all of text into the graphics file, or to verify that all necessary text items are present in a graphics file that is associated with the group.

Translations of the text can also be stored in the text repository 30. The database has access to a translation placeholder module 40 that uses translation expansion ratios and the length of the original text to generate an estimated spatial requirement for a given translation. Additions and modifications to the text items may also be made by accessing the text repository independent of the graphics software environment as the text is developed. The database includes information with each text item that records a date of the most recent update to the text in the record. The graphics designer may then insert the independently developed text into the graphics file using the text tool 21, described below.

On the client side of the tool, an authoring system 20 includes a graphics application 22 and the text tool 21 that interfaces with the server on which the text repository 30 resides. The text tool includes a gateway to a query engine that is part of the text repository database. When the author wants to insert text, the author uses the text tool database query engine gateway to specify the indexes that are relevant to the text to be inserted. The database query engine returns the selected text to the author. The tool 10 keeps track of the relationship between the imported text and its location in the database. At any time the author can send text to the server side for translation or update. Using the information about the relationship between the imported text and its location in the database, the tool provides updated text or translation, or a placeholder as described above. When text in the graphics file is replaced a text format conservation system may be used to automatically conserve the formatting. A text update tool 50 includes a verification component that updates the text in the database when a graphics file is saved.

An authoring tool such as the one described above is useful in many settings. A company may be developing designs for packaging of many different products in which the same warning label and ingredient list are used in both English and Spanish. The author may generate his design and seamlessly integrate the copy in English and Spanish in their packaging, thereby dramatically cutting the time to produce the packaging. Alternatively, an advertising campaign may include many ads that all contain the same text. The text can be loaded into the text repository prior to final approval by the legal department and the ads can be designed with the proposed text. During the course of design the authors can check for finalized text, and the ads can be produced quickly with the assurance that the text is correct.

The rest of the description is divided into four sections. Three sections each define a functional component of the authoring tool The sections are the creation of the text repository, the grouping of a set of text strings related to a specific artwork piece, and the insertion, verification and update of text items in the artwork piece. Although the authoring tool allows for these three tasks to be done in any order, or in parallel, for the sake of simplicity they will be described as separate sequential tasks, with the understanding they can be performed in parallel. A final section describes one embodiment of the invention in which the authoring tool includes a text repository that is maintained as a database on a remote server and a text tool that is capable of querying the text repository database and is provided in the form of a plug-in for a graphics software package.

Text Repository Creation

A user, such as the graphic designer or other personnel who draft text for the graphics project can define a repository of text that they will be able to access repeatedly to store and retrieve text strings. Each text string is stored as a record in the database. Using database functionality, the user will first define and represent categories of textual components present in their artwork projects, for example safety warnings, toll free numbers, expiration dates, etc. For the purposes of this description the categories of textual components are called "items." Each text record will include one or more attributes that represent an item with which the text is associated.

By creating new text records, the user can then define and represent strings of text that are instances of the categories of textual values, or items, that are called segments. For example, a segment for the item toll free number might be 1-800-123-45-67. There can be several segments, or records, for the same item. The user can define and represent segments in different languages and specify that some segments are related because they are translations of each other in different languages.

If the user wants to create a translation segment for an existing segment, but does not know the actual text of the translation, the user can use a generate placeholder feature of the authoring tool. This feature automatically generates a placeholder text for the translation. This placeholder is a sequence of characters that is generated using an algorithm that takes as input the original text and an expansion ratio which is the expansion ratio between the language of the original text and the language of the translation. The placeholder will usually thus have a length which will be very close to the final actual translation. This feature is advantageous because in many cases graphic designers have had to totally redesign designs that were at an advanced stage because they ultimately got a final translation that did not fit in their design. The placeholder can be used by the designers to calibrate their design while they are waiting for the actual final translation.

By, for example, adding additional attributes to a text record, the user can also define and represent a special type of segment called composite segments which are a combination of one or more other segments which can themselves be regular segments or composite segments. An example where a composite segment is useful is the following. The European Community requires toy manufacturers to print on their packaging the name and contact information for the distributor of their product in the country where the product is sold. Often a product is sold in many countries at once using the same package; therefore the package must include the names of the distributors for many countries. The authoring tool allows the user to define a segment for each of the distributors in each European country, and then define a composite segment that includes these entire individual segments. This way, the user can manage each distributor address individually, and include the composite segment of all the distributors in any artwork, instead of having to include them one by one. Another advantage of composite segments is that, although the authoring tool processes them as though they are composed of several individual segments, the graphics package sees them as one piece of text and therefore the designer can use paragraph formatting features such as text wrapping on the totality of the composite segment that has been inserted in the artwork project.

Text String Grouping

By adding attributes to the database record that stores a text string, the user can also define arbitrary properties for segments in order to help manage the segments by grouping them by the similarity of their properties. Properties that can be useful to manage the segment are, for example, the language of the text in the segment, the country the segment is meant for, or the location of the segment on the package.

Once the user has defined segments and items, the items can be inserted individually in any artwork project. Also, the user can decide to create a table of items that will be inserted together in a given file. A group of items that will be inserted together in a given file is called a SKU.

The graphic designer can access the text repository database 30 through a plug-in from within the graphics authoring package, such as Illustrator in one embodiment. The graphic designer can insert text from the text repository in a graphic artwork file. This can be done in two ways. The graphic designer can select specific segments and insert them individually in the graphic artwork file. The graphic designer can also select a SKU that has been defined in the text repository database and insert the group of segments associated with this SKU all at once in the artwork graphics file. Once text has been inserted in the artwork graphics file, the authoring tool keeps track of the relationship between text in the artwork and any segments and/or SKU to which the text is related. When any segment insertion takes place, the inserted segments can be automatically grouped into segment groups based on any of their properties. It is often advantageous to group text segments according to language or location. The graphic designer can manually set which properties, if any, should be used for segment grouping. Once segments have been inserted in the artwork, the text can be formatted in any way supported by the graphic design package.

The authoring tool includes a verification function that can check that the segments in an artwork graphics file are the same text as their corresponding segments in the text repository database, and that the SKUs in an artwork graphics file are the same text as their corresponding records in the SKU table in the text repository database. This is done both by comparing the last modification date of text in the graphics file with a last modification date of the text record in the database and by comparing, word by word, the content of the text record with the text in the graphic file. If there is a discrepancy between the text in the artwork and the text in the text repository database, the authoring tool will advise the graphic designer and propose an update that would synchronize the text in the artwork with the corresponding text in the text repository database. For example, if a word has been changed in a segment in the database, then the authoring tool will alert the graphic designer that the segment in the artwork is not in sync with the segment in the artwork, and will suggest replacing the present text in the artwork with the present text from the database. If a segment has been removed from a SKU in the database, the authoring tool will alert the graphic designer that the artwork includes an extra segment, and will ask the graphic designer if the extra segment should be removed from the artwork. If a segment has been inadvertently modified in the artwork file by the designer, the authoring will notify the designer there is a discrepancy between the artwork and the text repository database and suggest the change to synchronize the database and the artwork. Any such change can be done using the format conservation algorithm in order to minimize any manual rework on the part of the graphic designer.

At any point in time the graphic designer of the authoring tool can identify all the arbitrary properties of any segment that has been inserted using the authoring tool. In the preferred embodiment, these arbitrary properties include item name, language, and brand. Also, at any point in time the graphic designer of the authoring tool can select a segment by specifying its properties. An example of when this is useful is when an artwork contains segments in many languages that the graphic designer does not know. For example, let us take the example of a package with 8 different languages, including Flemish, French, German, Italian, Czech, Hungarian, Polish, and Serbian. Such packages are common in Europe, especially in the area of consumer packaged goods. Often, a designer who only speaks English is designing this package, and may be asked to make sure the safety warnings appear in the following order: Italian, French, German, Hungarian, Czech, Polish, and Serbian. Without the authoring tool, this is a difficult task for the English speaking designer. With the authoring tool, the designer simply has to select segments based on the segment properties, which include language and item name. The designer selects a segment that has the properties of the first safety warning, in this case, Italian and safety warning, and can move them in the design layout so that they are in the right order.

An advantage of being able to access segments by their properties is that the graphic designer can now access and view the segments in the artwork in a consistent sequential way. This is difficult when only relying on the visual aspects of the artwork. The authoring tool provides a list of all the segments in the artwork. In the preferred embodiment this list is displayed through a list box on which the graphic designer can click to select the corresponding segment in the artwork.

The system can also generate a report of all the segments in a piece of artwork. In the preferred embodiment, it will list all the segments, including their text, their item name, their language, and their country of use.

When an artwork graphics file is saved, as part of the verification process the text tool updates the database to keep track of the segments in the file. That enables the user of the authoring tool to use the text repository database to know what files include what segment. An example of when it is advantageous to be able to locate all graphics files that include a given segment is when a company changes one of its phone numbers. Using the authoring tool, the graphic designer can search the database for all the artwork graphics files that need to be updated to change this phone number. A picture of the current state of the design is also uploaded to the database when the file is saved.

Text Insertion and Modification with Format Conservation

When text is inserted into an existing label or package design, it may be provided as a file to be imported, especially when the insertion is being performed by automatic means. One such system in which text may be automatically inserted into a label from an externally maintained text repository database is described in U.S. Provisional Patent Application No. 60/776,159, which is incorporated herein by reference in its entirety for all purposes. Usually, the text must then be formatted by a designer, who may change fonts, sizes, and colors of the characters and laying the text out in the target packaging space. This formatting may be done, for example, using a software package such as Adobe Illustrator. Later, the words of the text may be changed, added, or deleted in the text as it is stored in the text repository database. Previously, this would require re-formatting of the text from the text repository to be performed by the designer.

The text format conservation tool described herein maps formatting from the prior version of the text to newly inserted text, so that much of the formatting work that has been done is conserved. In most cases, the insertion of new text into a previously formatted version will not require any manual re-formatting.

Figure 2:
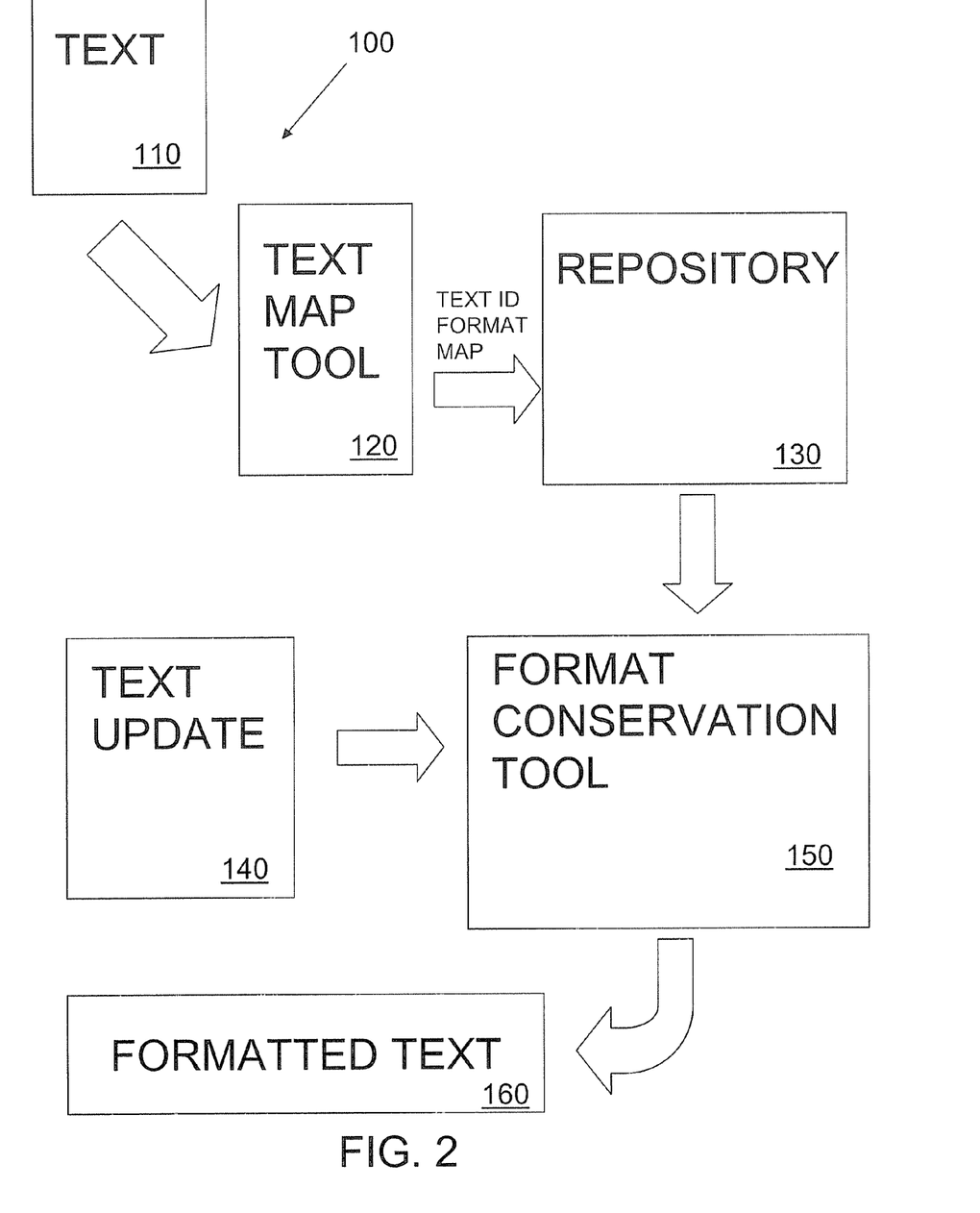
FIG. 2 is a functional block diagram of an authoring tool constructed in accordance with an embodiment of the present invention that includes a text format conservation tool.

Referring now to FIG. 2, a text format conservation system 100 is shown as functional blocks. These functional blocks may be implemented, for example, in software stored in microprocessor memory. A block of text 110 is accessed by a text map tool 120. The text map tool parses the text and divides it into small components, such as words. The components are stored in a text map according to the region of the overall text block in which they reside along with their corresponding format information in a text repository 130.

A text update 140 that makes changes to the original text block 110 is received by a format conservation tool 150. The format conservation tool retrieves the text map of the original text block from the repository 130. The format conservation tool 150 compares the updated text on a per component basis to the text map as will be described below in connection with FIG. 3 and applies the formatting from the original text to the updated text according to formatting rules to produce a formatted version of the updated text 160.

Figure 3:
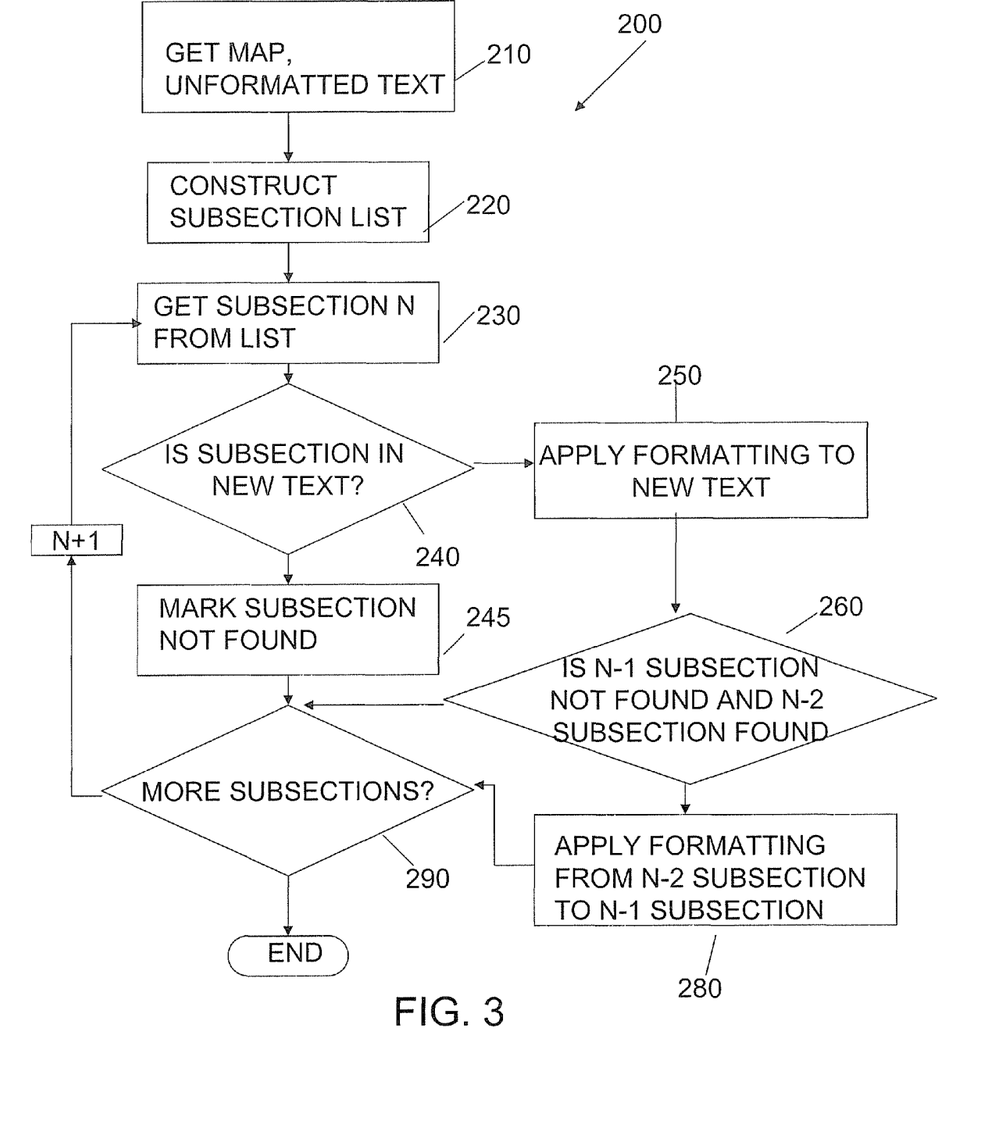
FIG. 3 is a flowchart outlining a method of conserving text formatting information according to an embodiment of the present invention.

FIG. 3 illustrates an example of an updated text block 300 that is compared to a mapped version of an original text block stored in a text format map 310. The position, textual content, and format of each component is recorded in each row of the map. In this case a component corresponds to a word, but other segmentation such as by character or line could also be utilized. The formatting tool update applies the original formatting to the update to produce the formatted update 320.

Figure 4:
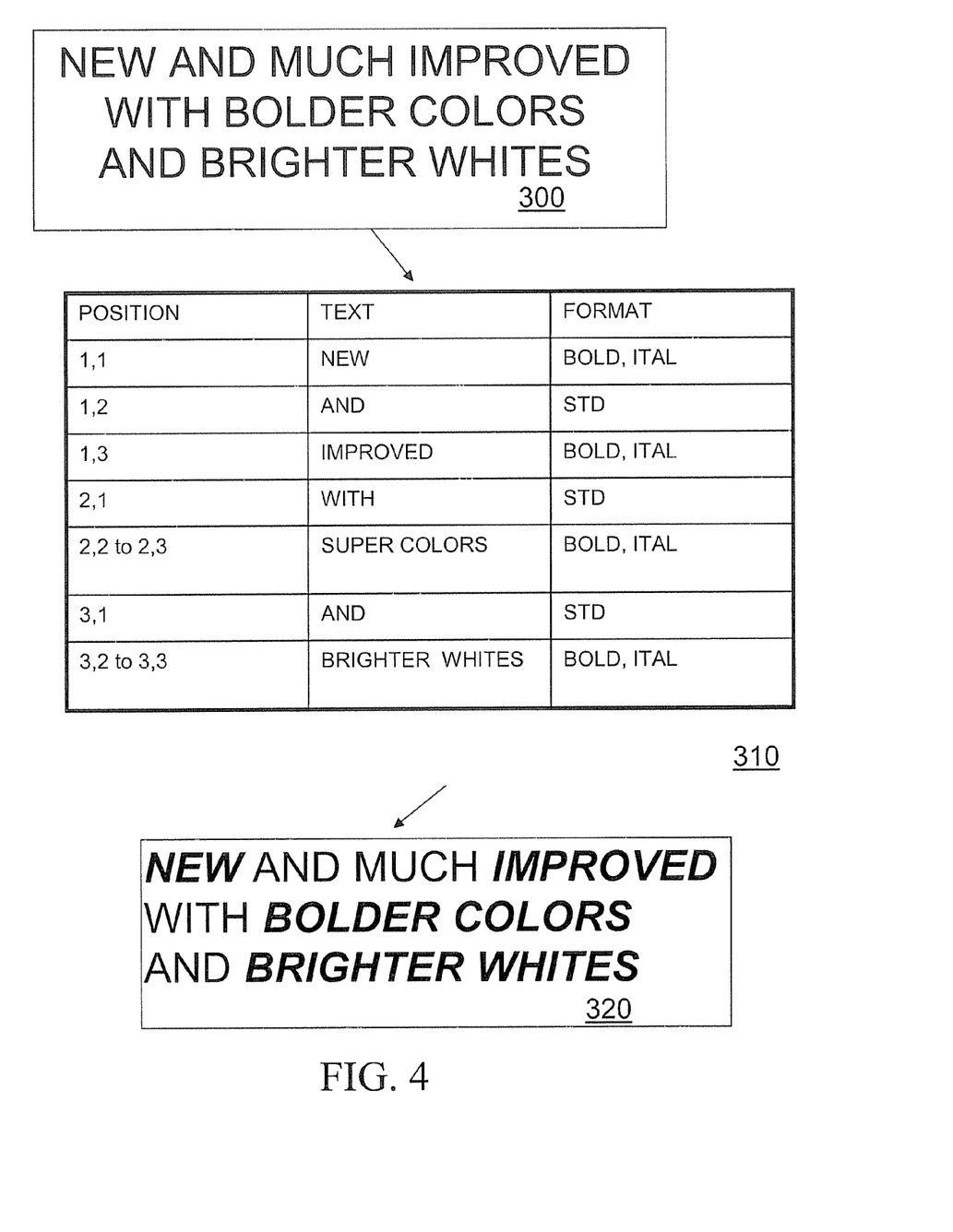
FIG. 4 is a schematic diagram of one example of an unformatted text update being formatted by the text format conservation system.

FIG. 4 illustrates a procedure 200 that can be used by the format conservation tool 150 (FIG. 2) to apply formatting from an original text block to an updated version of the text block. At 210 the map of the original text and the unformatted text update are input. At 220, a list of subsections consisting of text components each corresponding to, for example, a single word of the updated text is constructed. A next subsection N is retrieved from the list and the corresponding subsection in the mapped text block is searched for a match. At 250, if a match is found, the updated text is formatted in the same manner as the original. If the subsection is not found the subsection of the updated text is marked as not found and a next subsection, if any exist, is retrieved at 290. Also at 250, if any subsection N that is found in the mapped text is preceded by a N−1 section marked not found and the N−2 subsection preceding that section found, the formatting from the N−2 subsection is applied to the N−1 subsection.

Remote Text Repository Database and Text Tool Plug-In

As already discussed above, many of the benefits of the authoring tool arise from the fact that the textual components, or segments, of a artwork graphics file are maintained separately in a text repository, such as a database. By defining many database attributes with respect to each segment, the segments can be grouped and sorted by category, language, product, brand, and artwork project. The segments can be accessed independently by personnel from diverse functional areas such as marketing, legal, and graphic design. The segments included in a package or label can be drafted and modified independent of the text and the graphics designed can access the database to retrieve the most recent version of the segment.

In one embodiment, the text repository database is maintained on a remote server. User accounts are created for personnel who need access to the segments stored in the database. The accounts can be given varying levels of access depending on a user's needs and qualifications. For example, some user accounts may be granted read-only access while others can be given editing capabilities. The users access the database through a set of APIs through which they can query the database and store and edit segments in the database. The users can add additional attributes or create tables that associate segments into groups on additional attributes, such as a new artwork graphics project (SKU) or linked together to form a composite segment. The structure of the database thereby allows a user to track and retrieve all artwork files that use a specific segment or type of segment. The user can track and retrieve all the segments that are used in a given artwork file and generate a report, usually called a copy sheet.

The text repository database may also store an intermediary state of the artwork in a simplified graphical format so the user can check the state of the graphical work by accessing the text repository database without having the graphical design software package. The text repository database may also store a detailed history of all the changes that are made to each segment by users. This is useful to comply with different auditing requirements such as Sarbanes-Oxley, or FDA regulations. As described above, the text repository database may include a translation tool that generates translations of segments or placeholders that can be used to approximate an amount of space that will be consumed by a translation.

The text tool component of the authoring tool may be provided as plug-in to an existing graphics software package. The plug-in allows the graphic designer to connect to the text repository database through, for example, any type of network such as a LAN, WAN, or Internet. The plug-in integrates in the existing graphical software through its plug-in architecture. The plug-in includes a database access tool that is a gateway to a database query engine that allows the graphic designer to retrieve and insert segments from the database into the artwork graphical file and to query the database to determine list of items inserted in the artwork graphical file is and to display specific properties of the item such as language, country, and brand.

The text tool includes a verification function that can compare, for a given text entry in the graphics file, the textual content of text in the corresponding text record in the database as well the date of most recent update of a text record in the database with a date of most recent update for each of the items in the graphical file. The text tool informs the graphic designer of any discrepancies between the item in the file and in the database, and lets the graphic designer automatically update the segment in the artwork file to be in sync with the one in the database. The text tool may include the text format conservation tool described above that can automatically update a segment in the artwork with text from the database, while conserving all its formatting, font, color(s), kerning, etc. The plug-in can create a relationship between a given artwork and a SKU defined in the database by, for example, creating a table listing all text records containing segments that are part of the given artwork. Once the relationship has been created, the graphic designer can retrieve and insert all the segments that are included in the database as being present in a given SKU, and verify that all the segments and no other segments are included in the artwork file. In addition, the graphic designer can verify this is the case at any point in time, and if changes have occurred, either in the database or in the artwork file, synchronize the artwork file so it is in sync with the SKU as defined in the database. The plug-in automatically creates groups to group segments into. These new groups are generated dynamically based on the properties of the segments being inserted in the artwork. What property to use can be set by the graphic designer on an individual file basis.

The plug-in includes specialized display capabilities. For example, a graphic designer can highlight and focus on a segment in the artwork based on selection from the list of all segments by the graphic designer or sequentially highlight all the segments in the artwork one by one, by selecting items in the list one by one sequentially. The graphic designer can thereby review the segments and perform quality assurance on the artwork by sequentially highlighting the segments one by one. The plug-in text tool supports multilingual and Unicode.

While the present invention has been illustrated by the description of embodiments thereof, and while the embodiments have been described in considerable detail, it is not the intention of this specification to restrict or in any way limit the scope of the claims to such detail. Additional advantages and modifications will readily appear to those skilled in the art.

The invention claimed is:

1. An authoring tool, stored on a server of a digital system, for creating graphic files that include text comprising:
 a text repository that stores text for insertion into a graphic file, the text repository including at least one table of text records, wherein each of the text records is associated with the same graphic file; and
 a text tool that operates within a graphical programming environment that retrieves the text from the text repository for insertion into the graphic file and recording a relationship between the inserted text and a related record of the repository, the text tool querying the text repository, based on the relationship, and including a text verification component that compares text in the graphic file with corresponding text in the repository for discrepancies between the text already inserted in the graphics file and the text of the related record, and in response to detecting a discrepancy, replacing the already inserted text with the present text from the related record.

2. The authoring tool of claim 1 wherein the text repository resides on a server remote from the text tool.

3. The authoring tool of claim 1 wherein the text tool includes a gateway to a query engine that is operable within the graphical programming environment to query the text repository.

4. The authoring tool of claim 1 wherein the text already inserted in the graphic file is replaced while maintaining existing text formatting in the graphic file.

5. A method for inserting text into a graphics file, the method comprising:
 populating a database with records that include text content and a text attribute;
 from a graphical programming environment, querying the database to select records that include text meeting the query criteria;
 inserting the text from the returned records into a graphics file and recording a relationship between the inserted text and the related record;
 querying the database, which includes at least one table of text records with each of the text records being associated with the same graphic file, using a text verification component that compares text in the graphic file with corresponding text in the repository, based on the relationship, for discrepancies between the text already inserted in the graphics file and the text content of the related record; and
 in response to detecting a discrepancy, replacing the already inserted text with the present text from the related record.

6. The method of claim 5 comprising the step of verifying the text in the graphics file by comparing text in the graphics file with text in one or more corresponding database records.

7. The method of claim 5 comprising the step of maintaining existing text formatting in the graphic file when replacing the text in the graphics file.

8. Computer readable media having computer executable instructions stored thereon for performing method steps for managing text in a graphics file from a graphical programming environment, the steps comprising:
- providing a gateway to a query engine that select a database record containing a text item including text content and a text attribute from a text repository including at least one table of text records with each of the text records being associated with the same graphic file;
- inserting the text item contained in the selected database record into the graphic file;
- recording a relationship between the inserted text item and the related record;
- querying the text repository using a text verification component that compares text in the graphics file with corresponding text in the repository based on the relationship, for discrepancies between the text already inserted in the graphics file and the text content of the related record:
- verifying the text item that has been inserted in the graphics file by comparing the text item in the graphics file with a text item in one or more of the corresponding database records: and
- in response to detecting a discrepancy, replacing the already inserted text with the present text from the related record.

9. The computer readable media of claim 8 wherein the method steps include the steps of comparing the text that is inserted in the graphic file with database records present in a corresponding database table that includes all database records designated for insertion in the graphics file and providing an alert if the text in the graphics file does not correspond to text in the database records.

10. The computer readable media of claim 8 wherein the method steps include the step of maintaining existing text formatting in the graphic file when replacing the text in the graphics file.

* * * * *